(12) United States Patent
Huang et al.

(10) Patent No.: US 9,455,430 B2
(45) Date of Patent: Sep. 27, 2016

(54) INTEGRAL BI-LAYER SEPARATOR-ELECTRODE CONSTRUCTION FOR LITHIUM-ION BATTERIES

(71) Applicant: GM GLOBAL TECHNOLOGY OPERATIONS LLC, Detroit, MI (US)

(72) Inventors: Xiaosong Huang, Novi, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/929,575

(22) Filed: Nov. 2, 2015

(65) Prior Publication Data

US 2016/0056437 A1    Feb. 25, 2016

Related U.S. Application Data

(62) Division of application No. 13/045,563, filed on Mar. 11, 2011, now abandoned.

(51) Int. Cl.
  *H01M 2/14*  (2006.01)
  *H01M 2/16*  (2006.01)
  *H01M 10/0525*  (2010.01)

(52) U.S. Cl.
  CPC ........... *H01M 2/1673* (2013.01); *H01M 2/145* (2013.01); *H01M 2/1646* (2013.01); *H01M 2/1653* (2013.01); *H01M 2/1686* (2013.01); *H01M 10/0525* (2013.01); *H01M 2220/20* (2013.01); *H01M 2220/30* (2013.01); *Y02E 60/122* (2013.01); *Y02P 70/54* (2015.11); *Y02T 10/7011* (2013.01); *Y10T 29/49108* (2015.01); *Y10T 29/49115* (2015.01)

(58) Field of Classification Search
  CPC ....................................................... H01M 2/14
  See application file for complete search history.

(56) References Cited

U.S. PATENT DOCUMENTS

| 6,270,928 B1 | 8/2001 | Andrieu et al. |
| 7,682,740 B2 | 3/2010 | Yong et al. |
| 2007/0082261 A1 | 4/2007 | Lee |
| 2009/0111025 A1 | 4/2009 | Lee et al. |
| 2009/0197175 A1 | 8/2009 | Nagai et al. |
| 2010/0261065 A1* | 10/2010 | Babinec ............... H01M 2/166 429/246 |

* cited by examiner

*Primary Examiner* — Jacob Marks
(74) *Attorney, Agent, or Firm* — Reising Ethington P.C.

(57) ABSTRACT

A porous bi-layer separator is composed of a first separator layer with a contacting array of non-conducting particles overlaid with a second separator layer of a microporous polymer layer, fabricated on the electrode surface of the anode of a lithium-ion battery to form an integral electrode-separator construction. Exemplary bi-layer separators may be fabricated by deposition of solvent-containing slurries of separator particles followed by solvent evaporation to produce the particle layer with subsequent application of polymer solutions followed by controlled evaporation of solvent to produce the microporous polymer layer. The elevated temperature performance of lithium-ion battery cells incorporating such integral electrode-bi-layer separators was demonstrated to exceed the performance of similar cells using commercial and experimental single layer polymer separators.

20 Claims, 3 Drawing Sheets

INTEGRAL BI-LAYER SEPARATOR-ELECTRODE CONSTRUCTION FOR LITHIUM-ION BATTERIES

CROSS-REFERENCE TO RELATED APPLICATION

This application is a divisional of U.S. patent application Ser. No. 13/045,563, filed Mar. 11, 2011, (the entire contents of which are hereby incorporated by reference).

TECHNICAL FIELD

This invention pertains to bi-layer porous separators integral with an electrode of a lithium-ion cell to assure electrical separation between the anode and cathode of the cell. More specifically, this invention pertains to the sequenced deposition of conformal, electronically non-conductive, porous ceramic and polymer coatings on one of the cell electrodes to form a cooperating electrode-separator construction.

BACKGROUND OF THE INVENTION

Lithium-ion secondary batteries are common in portable consumer electronics because of their high energy-to-weight ratios, lack of memory effect, and slow self-discharge when not in use. Rechargeable lithium-ion batteries are also being designed and manufactured for use in automotive applications to provide energy for electric motors to drive vehicle wheels.

The basic unit of a lithium-ion battery is an individual cell which includes an anode, a cathode and a liquid, non-aqueous electrolyte suitable for carrying and conveying lithium ions. Lithium-ion batteries of different sizes, shapes and electrical capabilities may be fabricated by electrically connecting any suitable number of these cells in parallel, series or a combination of these to develop a battery of suitable voltage and capacity. Within an individual cell, the anode on discharge becomes the cathode on charge, and the cathode on discharge becomes the anode on charge. From here forward, the electrode that is the anode on discharge (the negative electrode) will be referred to as the anode, and, correspondingly, the electrode that is the cathode on discharge (the positive electrode) will be referred to as the cathode.

In the anode, elemental lithium is often stored between the sheets or layers of a graphite structure forming lithium-intercalated graphite. During discharge, lithium ions migrate out of the lithium-graphite while, during charge, the lithium ions are re-inserted into the graphite. The cathode may be formed from any lithium based active material that can sufficiently undergo lithium intercalation and deintercalation. For example, in various embodiments, cathode may comprise, among others, at least one of spinel lithium manganese oxide ($LiMn_2O_4$), lithium cobalt oxide ($LiCoO_2$) and nickel-manganese-cobalt oxide [$Li(Ni_xMn_yCo_z)O_2$].

A lithium-ion battery generally operates by reversibly transporting lithium ions between its negative and positive electrodes. To prevent physical contact (electron-conducting contact) between the anode and cathode which would result in an internal short circuit, a separator, is positioned between the electrodes. The separator, commonly a polyolefin polymer is microporous and contains small pores which are filled with electrolyte to provide pathways for passage of lithium ions from one electrode to the other. Microporous separator materials in common use include polyethylene or polypropylene. The microporous separators may be about twenty-five to about thirty microns thick and exhibit thirty-five percent or more porosity.

Each of the negative and positive electrodes is also carried on or connected to a metallic current collector (typically copper for the anode and aluminum for the cathode). During battery usage, lithium is oxidized at the anode to form lithium ions which are then transported from the anode and received by the cathode, passing through the ion-conducting electrolyte in the separator pores to form an internal circuit. The current collectors associated with the two electrodes are connected by a controllable and interruptible external circuit which allows an electron current to pass between the electrodes. The external electron current serves to electrically balance the internal circuit resulting from the transport of lithium ions through each cell.

The battery may then be re-charged by passing a suitable direct electrical current in the opposite direction between the electrodes. During recharging, the flow of lithium ions is reversed and they pass from cathode to anode where they are reduced to lithium metal and re-intercalated into the graphite.

In principle, such a discharge-recharge procedure may be practiced indefinitely. But, under normal operating conditions, battery life is affected by the degradation of the active materials (e.g. anode, cathode and electrolyte) and abnormal operation can induce the formation of lithium dendrites, surface deposits of lithium on the anode. These dendrites, with continued growth may penetrate the thin polymer separator and to enable a direct connection, a short circuit, between anode and cathode. Also, if any fine metal particles are introduced into the inter electrode space during manufacture these too may enable a short circuit.

Penetration of commonly-used polymer microporous separator materials, such as polyethylene or polypropylene, is more likely at more elevated cell temperatures. For example at cell temperatures of greater than 130° C. the separator materials will soften appreciably and offer reduced resistance to penetration. Even if penetration of the separator does not occur, any prolonged exposure to temperatures in excess of 130° C. may result in shrinkage or even melting of the separator. Clearly, any of these behaviors, shrinkage, softening or melting, will diminish the separators ability to provide electrical insulation between the battery anode and cathode to prevent internal short circuits.

There is thus a need for a more durable and temperature tolerant microporous separator for lithium-ion battery cells.

SUMMARY OF THE INVENTION

This invention provides a method of forming a more thermally- and mechanically-robust integral combination of a separator and an electrode for a lithium-ion cell. The improved separator-electrode construction employs a thin bi-layer separator portion which is fabricated on, and attached to, a cell electrode which is itself supported by a coextensive current collector, usually fabricated of copper foil for the anode and aluminum foil for the cathode. Because it is common for the anode to be larger than the cathode, the separator will normally be deposited on the anode to ensure separation of anode and cathode. However deposition of a suitable separator on the cathode may also be practiced. In many embodiments of this invention, the entire current collector-electrode-separator structure is thin and may range from less than 100 micrometers to about one millimeter thick. Individually, the current collectors may be about 20 micrometers thick, the electrodes may be about 50 micrometers thick and the bi-layer separator may be about 25 micrometers thick.

The separator is formed by placing a first layer of separator material on an electrode surface followed by placement of a second layer on the first layer such that the electrode and bi-layer separator form an integral cooperating structure for assembly in a cell.

The first layer of the bi-layer separator is a laid-down fabrication of electrically non-conducting ceramic particles such as oxides or nitrides. The particles may be generally equi-axed and substantially uniformly sized and arranged to provide a continuous pore structure. The pores provide tortuous and non-straight passages through the layer of ceramic particles. A polymer binder material may be used to coat the particles, securing them to one another and to the electrode surface while leaving the porous passages. The second layer, overlying and at least coextensive with the ceramic particle layer, is a thin polymer layer or membrane. The polymer membrane is microporous, and forms interconnected passages extending through the thickness of the membrane for filling with a lithium ion-conducting electrolyte and for liquid transport of lithium ions. In another aspect, a non-porous polymer layer which forms a Li-ion conducting gel when saturated with liquid electrolyte may be used.

The two layers of the bi-layer separator cooperate to provide superior performance than may be achieved with single layer separators. The first, particle layer, comprising overlapping hard ceramic particles resistant to penetration offers improved resistance to mechanical breaching of the separator, for example by dendrites, metal fines, or detached electrode particles. The overlying, and at least coextensive polymer layer, supports and retains the particle layer by improving the adhesion between the coating layer and the counter electrode. The flexible and compliant polymer layer is effective in accommodating volume changes occurring in the electrode as lithium is inserted into and removed from the electrode during charge-discharge cycles.

The bi-layer separator is formed on an electrode supported by a metal current collector. The first layer of the bi-layer separator is fabricated by applying a first layer of ceramic particles directly on the cell anode. The ceramic particles may be generally equiaxed and fall within a predetermined size range. Preferably the maximum particle size is less 50% of the intended thickness of the ceramic layer. So two or more ceramic particles, when laid-down on the electrode in tiers will provide interconnected pores which are filled with liquid electrolyte in the operating cell. The ceramic particles may be bonded to one another and to the electrode with a thin coating of a suitable polymer binder. The polymer binder bonds the particles to one another and to the electrode surface while retaining porosity for an electrolyte that fills the pores and contacts the electrode.

Alternatively the particles may be loose and non-adhering. Overlying and adhering to the ceramic layer is a polymer layer, which may be microporous or capable of forming a Li-ion conducting gel when saturated with electrolyte. The polymer layer may be secured, at its periphery, to the electrode and also adhere to the outermost tier of particles to retain the particle layer in position.

In service, the integral combination of the electrode and bi-layer separator cooperates to enhance cell performance. The layer of ceramic particles is in intimate contact with the electrode surface and so minimizes the extent of any dendrites which form and reduce the interfacial resistance. This extends the useful working life of the cell improves the ability of the battery to tolerate abuse, and conveys good temperature resistance. The polymer layer provides additional electronic insulation and serves to retain the ceramic layer in intimate contact with the electrode and to suppress spalling or flaking of the ceramic layer. Absent the polymer layer, spalling or flaking of the ceramic particles may result from the cyclic growth and shrinkage of the electrode resulting from insertion and removal of elemental lithium, handling damage during cell assembly, or in-service thermal or vibratory stresses. The polymer layer may adhere to any one or more of the ceramic layer, the electrode or the current collector.

In an embodiment in which the ceramic particles are bonded to the electrode and to one another, the particles are incorporated into a dilute solution of a binder dissolved into a significant excess of solvent. Generally the binder will be present in an amount ranging from about 0.2% to 25% by weight of the solvent. The ceramic particles are added in suitable quantity to form a viscous, paste-like slurry with the dilute binder solution. Suitable ceramic particles may be any hard, electrically-insulating compound, often an oxide or nitride, and may include compounds of silicon, aluminum, titanium, magnesium or calcium. It is preferred that the particles have an average particle size of around 1 micrometer but particles with an average size ranging from about 0.005 micrometers to about 10 micrometers may be used. The particles may be irregular in shape but are preferably generally equiaxed so that when stacked together or compacted they will be in line or point contact with neighboring particles with pores between adjacent particles.

This particle-containing layer is primarily tasked with resisting mechanical penetration. For this reason it is preferred that the particle size be selected to be less than one-half of the desired layer thickness. This criterion should ensure that that the layer is composed of at least two tiers of particles so that particles in the upper tier may nest in the lower tier and more completely shield the surface from penetration.

The particle slurry may be applied to the cell anode in any convenient manner including a doctor blade, a slot die coater or a comma bar coater each of which is effective in applying a layer of generally uniform thickness coextensive with the electrode. The thickness of the applied slurry may be selected to ensure that the resulting particle layer thickness ranges from about 5 micrometers to about 45 micrometers. As deposited, the pores formed between abutting particles will be filled with the dilute binder solution. However, evaporation of the solvent will reduce the volume of the solution, causing it to shrink and leave a series of interconnected voids or pores behind. A volume fraction of voids of about 30% may be anticipated. Upon complete evaporation of the solvent the binder material will be left connecting all the particles and binding them together. The binder will also be effective in binding the particles to the graphite-based anode.

The choice of binder for the ceramic particle layer is partially informed by the procedure used to deposit the second, polymer layer of the bi-layer separator because the polymer second layer of the bi-layer separator is dissolved in a solvent and applied as a solution. It is preferred that the solvent used to dissolve the polymer of the second layer not dissolve the particle layer binder. But, the kinetics of dissolution are slow, while the coating and drying processes are rapid. So a solvent capable of dissolving the particle layer binder may be acceptable as may a solvent which induces swelling in the particle layer binder. Commonly deposition of the polymer overlayer occurs from a solution of polymer dissolved in, predominantly, acetone containing modest quantities of water. Hence it is preferred that the particle binder material be acetone-insoluble. Suitable acetone-insoluble binder materials for the ceramic powders may include PAN, polyamide or polyimide. Suitable solvents for these binders include DMF (dimethylformamide), DMSO (dimethyl sulfoxide), (THF) (tetrahydrofuran) and NMP (N-methylpyrrolidone).

Just as in the case of interparticle contact, there will be only line or point contact between the deposited ceramic and the anode surface so that an electrolyte, impregnated into the porosity of the ceramic layer, may freely contact and convey ions to or from the anode.

A solution of polymer, for example polyvinylidene fluoride (PVDF), dissolved in an acetone-water solvent containing an appreciable excess of acetone may be applied to the ceramic-binder layer. Upon evaporating the solvent PVDF will be deposited on the ceramic layer. But, evaporation of the solvent is selective with acetone evaporating first and promoting phase separation of the acetone and water constituents of the solvent as the concentration of water in the solvent increases. Since the polymer segregates to the acetone, final evaporation of the acetone produces a sponge-like, open-pored structure of polymer surrounding the remaining water. Further evaporation to eliminate the water results in formation of the desired microporous polymer layer. Again, such a microporous layer may be impregnated by electrolyte to enable transfer of lithium ions to and from the anode. The thickness of the ceramic layer may be about 25 micrometers with a porosity of about 40%, while the thickness of the polymer layer may be less than 10 micrometers with a porosity of greater than 40%.

To obtain good adhesion between the ceramic and polymer layers, the polymer-solvent solution should partially wet the binder layer securing the particles so that, after evaporation of the solvent, the precipitated polymer may bond to the ceramic binder coating.

When no binder is used in the first layer, particles can be sprayed onto the electrode. They can also be deposited on the electrode by a dispersion coating process as described previously. If the particles of the powder layer are not attached to one another and to the electrode by a separate binder, a similar result may be obtained by coating the unattached powder layer with the acetone-water-PVDF solution just described. A portion of this dilute solution when applied to the particle layer may be wicked, by capillary action into the pores between the particles. Upon evaporation of the solvent the particles may be bound together and attached to the electrode by the PVDF. The particles may also be retained by the porous PVDF overlayer.

A suitable alternative polymer may be poly(methyl methacrylate) (PMMA). Paralleling the process just described for PVDF, a similar process of dissolving PMMA in an acetone-water solvent solution followed by selective evaporation may be followed to develop a porous PMMA layer. A non-porous layer of PMMA may also be applied using acetone alone as a solvent. In this case, the PMMA, when saturated with liquid electrolyte forms a Li-ion conducting gel for lithium ion transport within the cell.

Thus, this invention provides a porous bi-layer separator membrane with an inner ceramic layer which offers increased temperature resistance and increased resistance to penetration, whether by dendrites, metal fines or electrode particles. The ceramic layer, which may be somewhat brittle and prone to spall under vibratory loads, is supported by the more compliant, adherent microporous polymer layer. In turn, the ceramic layer restrains shrinkage of the polymer layer and will continue to serve as an electrode separator even if the polymer layer softens or melts.

The performance of cells fabricated using the bi-layer separator was compared to that of cells fabricated using a commercial microporous polypropylene separator. Relative to cells with the conventional separator, cells with the bi-layer separator exhibited superior resistance to elevated, about 150° C., exposure.

DESCRIPTION OF PREFERRED EMBODIMENTS

The following description of the embodiment(s) is merely exemplary in nature and is not intended to limit the invention, its application, or uses.

Embodiments of this invention are separators, and practices to fabricate such separators, intended to be positioned between the facing anode and cathode of a lithium ion battery. Such separators prevent electronic conduction between the facing electrodes but enable transport of lithium ions contained in the liquid non-aqueous electrolyte from anode to cathode as the cell discharges and from cathode to anode as the cell is charging. In current practice single-layer separators are commonly used and may comprise a polyolefin, for example polypropylene or polyethylene. Such separators are porous and wet by the cell electrolyte and so incorporate electrolyte for transport of lithium ions through the separator while preventing electronic conduction. These, single layer, porous, polyolefin separators, particularly at elevated cell operating temperatures offer little resistance to penetration, for example by dendrites. Further, in some polymer separators, porosity is controlled by stretching the separator film to enlarge the pore size. When heated, such separators may seek to shrink and revert to their smaller, unstretched size and in so doing, expose portions of the opposing electrodes so that they may contact one another and short out.

The separators of this invention are bi-layer coatings at least coextensively applied to, and adherent to, the cell anode, and similarly intended to accommodate liquid electrolyte and enable passage of lithium ions while suppressing electronic conduction. The context of the invention may be best understood by consideration of a lithium ion battery as shown in FIG. 1.

Figure 1:
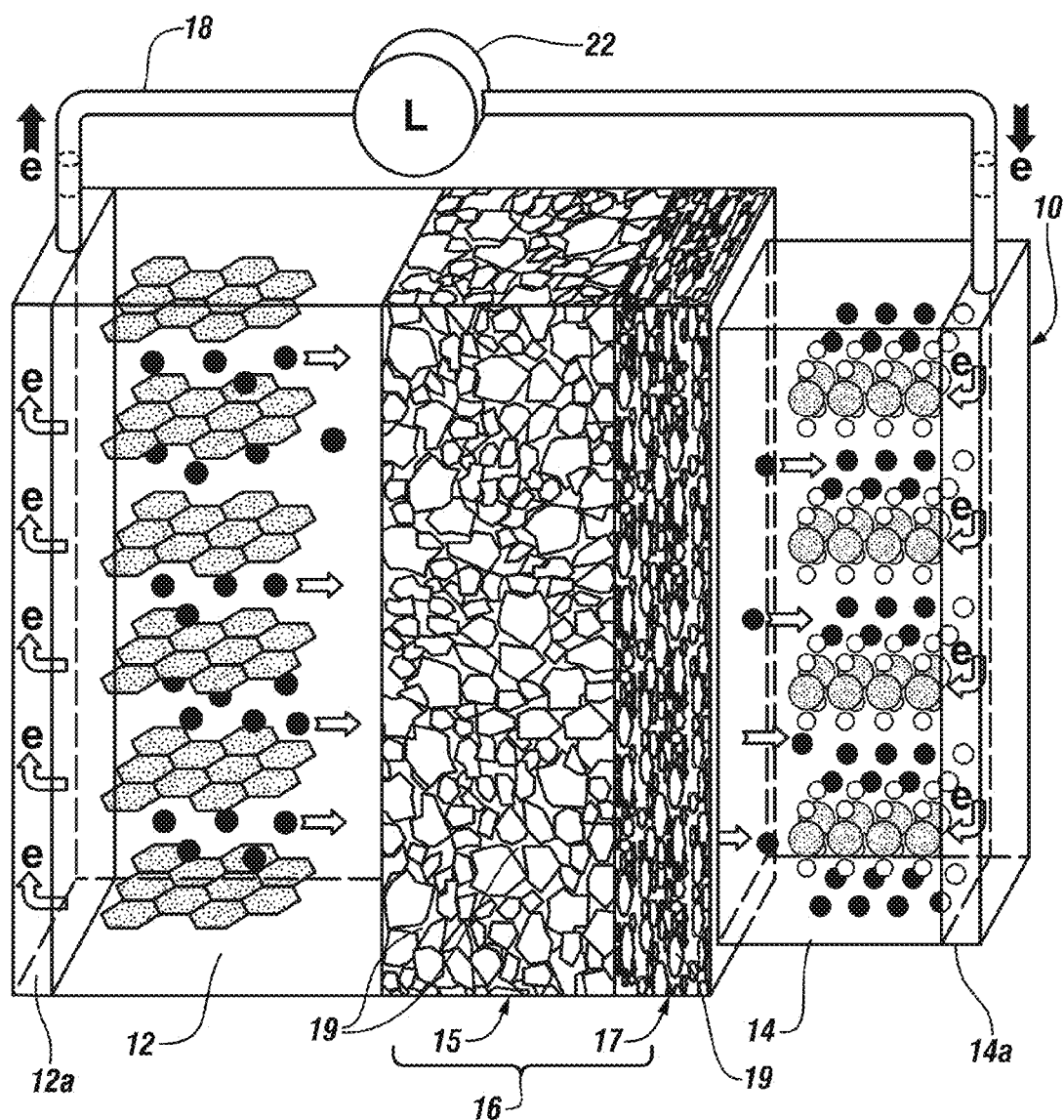
FIG. 1 is an enlarged, schematic illustration of a single cell of a lithium-ion battery with bi-layer separator. This view illustrates the flow of lithium ions in discharge mode without showing details of the flow through separator structure.

The lithium-ion battery 10 shown in FIG. 1 includes an anode 12, a cathode 14, and a bi-layer separator 16 incorporating a ceramic particle layer 15 and a microporous polymer layer 17. The bi-layer separator is attached to the surface of anode 12 and sandwiched between the two electrodes 12, 14. Bi-layer separator 16 is impregnated with electrolyte 19 which fills the pores and cavities of each of layers 15 and 17 and forms a continuous, lithium ion-conducting path between anode and cathode and vice versa. But bi-layer separator 16 functions as an electrical insulator and so, because it is sandwiched between anode 12 and cathode 14 prevents physical contact between electrodes 12, 14 to prevent the occurrence of a short circuit. An anode current collector 12a and a cathode current collector 14a may be positioned at or near anode 12 and cathode 14, respectively, to collect and move free electrons (e) to and from an external circuit 18. An interruptible external circuit 18 and load (L) 22 connects the negative electrode 12 (through its current collector 12a) and the positive electrode 14 (through it current collector 14a).

The lithium ion battery 10 can include a wide range of other components that, while not depicted here, are nonetheless known to skilled artisans. For instance, the lithium ion battery 10 may include a casing, gaskets, terminal caps, and any other desirable components or materials that may be situated between or around the negative electrode 12, the positive electrode 12, and/or the bi-layer separator 16 for performance related or other practical purposes. Moreover, the size and shape of the lithium ion battery 10 may vary widely depending on the particular application for which it is designed. One common, but non-limiting, example, is a button cell, usually intended for operation of low voltage hand-held devices which has the form of a thin disk with a diameter of less than 20 millimeters or so.

The lithium ion battery 10 can generate a useful electric current during battery discharge by way of reversible electrochemical reactions that occur when the external circuit 18 is closed to connect anode 12 and cathode 14. Both the anode and the cathode may contain intercalated lithium. The chemical potential difference between cathode 14 and anode 12—approximately 2.5 to 4.2 volts depending on the exact chemical make-up of the electrodes 12, 14—drives electrons produced by the oxidation of intercalated lithium at anode 12 through the external circuit 18 toward the cathode 14. Lithium ions, which are also produced at the anode, are concurrently carried by the electrolyte solution through the bi-layer polymer separator 16 and towards cathode 14. The electrons flowing through the external circuit 18 and the lithium ions migrating across the bi-layer polymer separator 16 in the electrolyte solution eventually reconcile and form intercalated lithium at the cathode 14.

In FIG. 1, elemental lithium intercalated between graphite planar layers is illustrated as black-filled circles. The lithium atoms are oxidized to lithium ions (not shown) and are transported through the liquid electrolyte 19 contained in the cavities (layer 15) and pores (layer 17) of bi-layer separator 16 to cathode 14. At cathode 14 the lithium ions are reduced to elemental lithium and are inserted into the crystal structure of cathode 14 composition. Anions (not shown) are formed in the electrolyte composition and flow counter to the lithium ions.

The lithium ion battery 10 can be charged or re-powered at any time by applying an external power source to the lithium ion battery 10 to reverse the electrochemical reactions that occur during battery discharge. The connection of an external power source to the lithium ion battery 10 compels the otherwise non-spontaneous oxidation of intercalated lithium at cathode 14 to produce electrons and lithium ions. The electrons (e), which flow back towards anode 12 through the external circuit 18, and the lithium ions, which are carried by the electrolyte across the bi-layer separator 16 back towards anode 12, reunite at anode 12 to replenish it with intercalated lithium for consumption during the next battery discharge cycle.

In many lithium-ion battery constructions each of the current collector 12a, anode 12, the separator 16, cathode 14, and its current collector 14a are prepared as relatively thin layers (for example, several microns or a millimeter or less in thickness) and assembled in layers connected in electrical parallel arrangement to provide a suitable energy package.

Anode 12 may include any lithium host material that can sufficiently undergo lithium intercalation and de-intercalation while functioning as the anode terminal of the lithium ion battery 10. Anode 12 may also include a polymer binder material to structurally hold the lithium host material together. For example, in one embodiment, the negative electrode 12 may be formed from graphite intermingled in at least one of polyvinyldiene fluoride (PVDF), a nitrile butadiene rubber (NBR), styrene butadiene rubber (SBR) or carboxymethoxyl cellulose (CMC). Graphite is widely utilized to form the anode because it exhibits favorable lithium intercalation and deintercalation characteristics, is relatively non-reactive, and can store lithium in quantities that produce a relatively high energy density. The anode current collector 12a may be formed from copper or any other appropriate electrically conductive material known to skilled artisans.

The cathode 14 may be formed from any lithium-based active material that can sufficiently undergo lithium intercalation and deintercalation while functioning as the positive terminal of the lithium ion battery 10. The cathode 14 may also include a polymer binder material to structurally hold the lithium-based active material together. One common class of known materials that can be used to form cathode 14 is layered or spinel lithium transitional metal oxides. For example, in various embodiments, cathode 14 may comprise at least one of spinel lithium manganese oxide ($LiMn_2O_4$), lithium cobalt oxide ($LiCoO_2$), a nickel-manganese-cobalt oxide [$Li(Ni_xMn_yCo_z)O_2$], or a lithium iron polyanion oxide such as lithium iron phosphate ($LiFePO_4$) or lithium iron fluorophosphate ($Li_2FePO_4F$) intermingled in at least one of polyvinyldiene fluoride (PVDF), an ethylene propylene diene monomer (EPDM) rubber, or carboxymethoxyl cellulose (CMC). Other lithium-based active materials may also be utilized besides those just mentioned. Those alternative materials include, but are not limited to, lithium nickel oxide ($LiNiO_2$), lithium aluminum manganese oxide ($Li_xAl_yMn_{1-y}O_2$), and lithium vanadium oxide ($LiV_2O_5$), to name but a few. The cathode current collector 14a may be formed from aluminum or any other appropriate electrically conductive material known to skilled artisans.

Any appropriate electrolyte solution that can conduct lithium ions between the anode 12 and cathode 14 may be used in lithium ion battery 10. In one embodiment, the electrolyte solution may be a non-aqueous liquid electrolyte solution that includes a lithium salt dissolved in an organic solvent or a mixture of organic solvents. A non-limiting list of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$ LiAsF$_6$, LiCF$_3$SO$_3$, LiN(CF$_3$SO$_2$)$_2$, LiPF$_6$, and mixtures thereof. These and other similar lithium salts may be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

Figure 2:
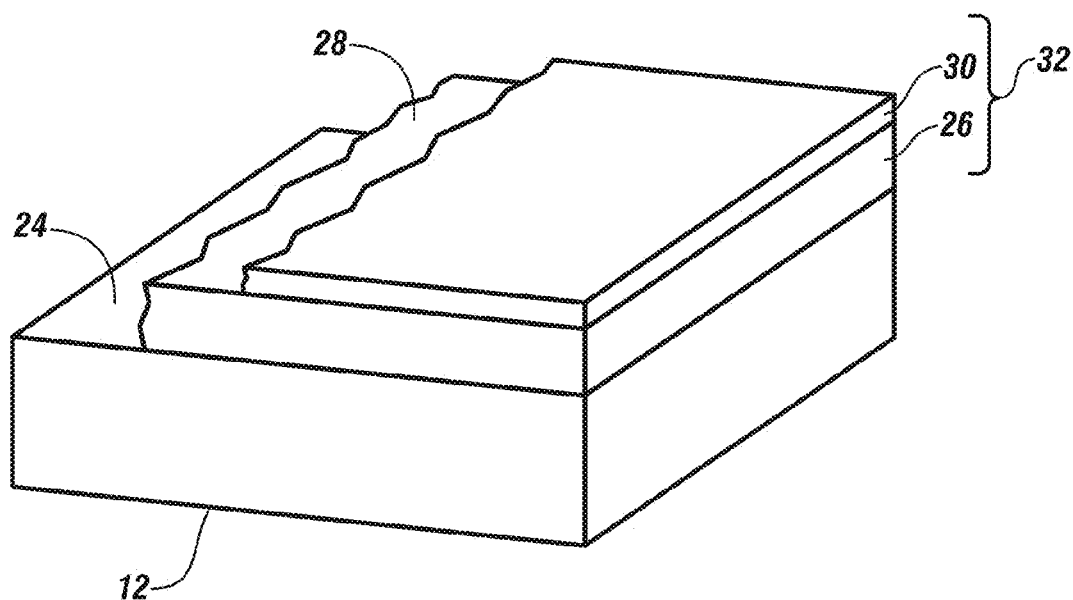
FIG. 2 is a schematic illustration of a graphite electrode (anode) on which is deposited a separator comprising a ceramic layer and an overlying PVDF layer, each shown in partial cutaway.

FIG. 2 shows, in partial cutaway, a schematic representation of a bi-layer separator 32, comprising a ceramic layer 26 and a microporous polymer layer 30, and representative of one embodiment of this invention. Ceramic layer 26 consisting of a layered array of bonded-together, irregularly-shaped particles of similar size (not shown) is bonded, to the surface 24 of anode 12 facing cathode 14 (not shown). A thin polymer coating (not shown) is used to bond layer 26 to the anode surface and to bond the particles to one another within layer 26. Overlying ceramic layer 26 is microporous polymer layer 30 adhered to ceramic layer 26 at surface 28. For clarity the layers are shown in partial cutaway but it is intended that both the ceramic and microporous layers be coextensive with one another and with anode 12 so that separator 32 may prevent any direct contact between anode and cathode.

Figure 3:
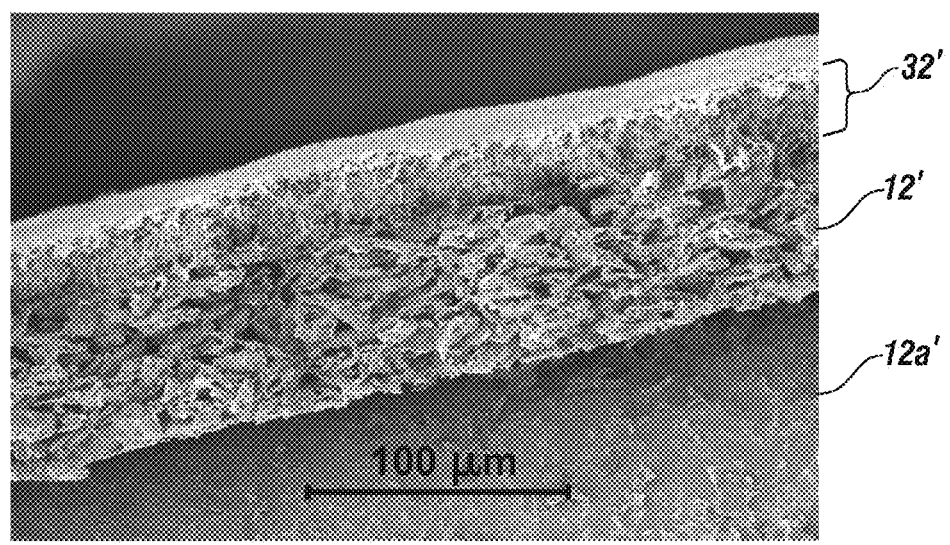
FIG. 3 is a low magnification Scanning Electron Micrograph of the fracture surface formed by cryogenic fracturing of a cell anode on which has been deposited a bi-layer, ceramic and microporous polymer separator to show the anode and separator in cross-section.
Figure 4:
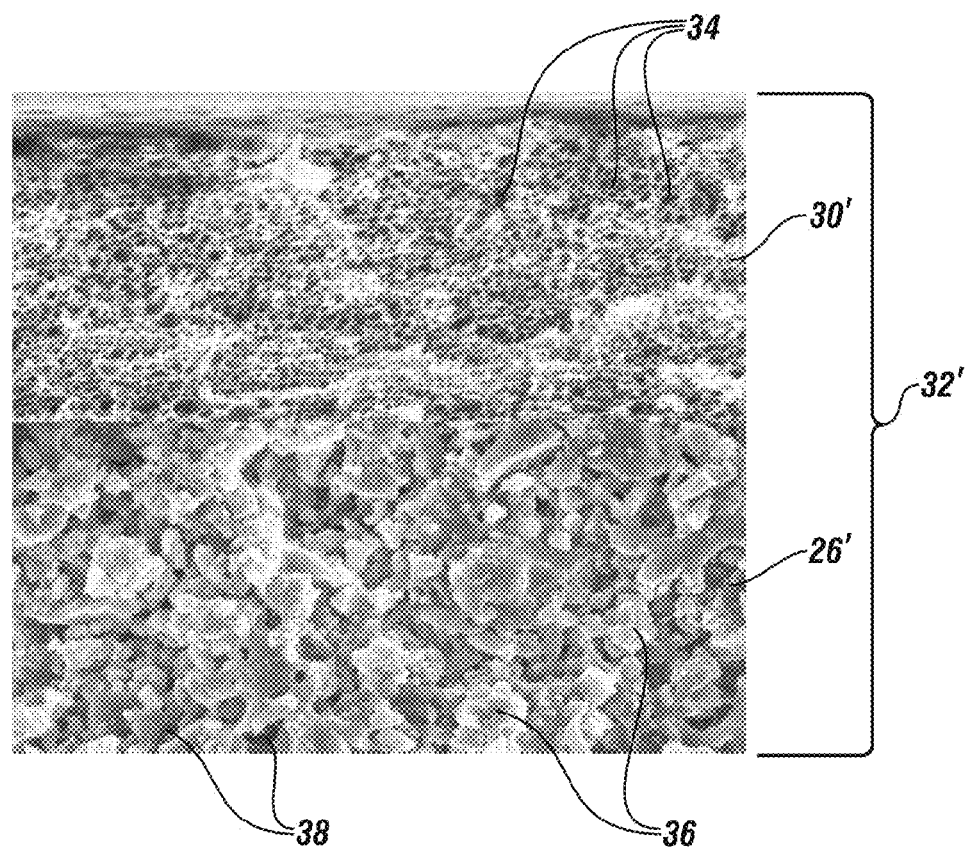
FIG. 4 is higher magnification cross-sectional Scanning Electron Micrograph of the separator shown in FIG. 3 to further illustrate the nature of the ceramic and polymer layers.

FIG. 3 shows, in cross-section, a scanning electron micrograph of a cross-section of a cryogenically-fractured anode 12' with such a bonded bi-layer separator 32' and also showing anode current collector 12a'. Details of the separator may be seen at FIG. 4, which shows an enlarged view of the cryogenically-fractured separator. The polymer layer 30' with micropores 34 may be clearly distinguished from particles 36 and the porosity resulting from the interconnected voids 38 between particles 36 in ceramic layer 26'. It may be noted that the voids in polymer layer 30' are appreciably smaller than those in ceramic layer 26'.

Such a bi-layer separator may be formed by the following exemplary procedure.

An anode may be prepared by spreading a slurry of graphite (90% by weight) with carbon black (6% by weight) and polyvinylidene fluoride (PVDF) dissolved in N-Methylpyrrolidone (NMP) as a binder on a 20 micrometer thick copper current collector and drying the deposited slurry at 100° C. for 12 hr.

A carrier solution for the ceramic coating may be prepared by dissolving 1 gram of polyacrylonitrile (PAN) in 100 grams of dimethylformamide (DMF) at 50° C. to form a 1 wt. % solution. A ceramic slurry may be formed by adding 65 grams of dried silica powder to this carrier solution and stirring vigorously to form a uniform dispersion. The silica dispersion may be used to form the ceramic layer in the bilayer separator coating.

A solution for a PVDF coating may be formed dissolving 6 grams of PVDF in 90 grams of acetone at 50° C., then adding 4 grams of water to the PVDF solution and stirring at 50° C. to obtain a uniform solution.

To form the bilayer separator, the silica dispersion may be uniformly coated on the surface of the graphite anode by any suitable means such as by extrusion or with a doctor blade. The thickness of the coating may be adjusted to achieve any desired thickness in the dried layer. A preferred dried coating thickness may range from about 5 to 40 micrometers. After partially-drying the ceramic coating by heating it to 80° C. for 4 min, the PVDF coating solution may be applied.

The PVDF coating solution may be applied to the ceramic coated electrode with a doctor blade or a slot die coater. A preferred thickness of the PVDF layer is between 5 and 20 micrometers and the applied thickness of the PVDF coating solution may be adjusted to achieve such thickness after solvent evaporation.

Solvent evaporation may result from blowing air across the surface of PVDF coating solution. Because acetone may be preferentially evaporated the solvent becomes enriched in water, resulting, after suitable increase in water concentration to phase separation into acetone-rich regions containing dissolved PVDF and water-rich regions containing minimal or no dissolved PVDF. Continued evaporation will remove the remaining acetone and precipitate PVDF. Water may be removed by drying the coating at 60° C. for 2 hours to leave an interconnected network of pores within a PVDF layer.

The PVDF layer may be effective in further securing the ceramic particles to the electrode as well as imparting a smoother coating surface. The PVDF layer is sufficiently effective in promoting adherence of the ceramic particles to the electrode that in an aspect the polymer binder may be eliminated and dry ceramic powders deposited on the electrode. The PVDF coating solution may then be applied to fully envelop the ceramic particles and contact the electrode surface. Upon solvent evaporation the layer of unbonded ceramic particles may be fully enclosed by the PVDF polymer overlayer, attached, at its edges, to the electrode.

In another embodiment, applicable to both a bonded and unbonded ceramic layer, poly(methyl methacrylate) (PMMA) may be employed as the polymer layer. A microporous PMMA layer may be fabricated using the acetone-water solution approach employed to deposit PVDF.

A non-porous layer of PMMA may be applied by evaporation of acetone from an acetone-PMMA solution. Such a non-porous layer of PMMA may also be effective because the PMMA, when saturated with electrolyte, will form a Li-ion conductive gel but generally the ionic conductance of such a gel will be less than the conductance of the microporous polymer layer.

Figure 5:
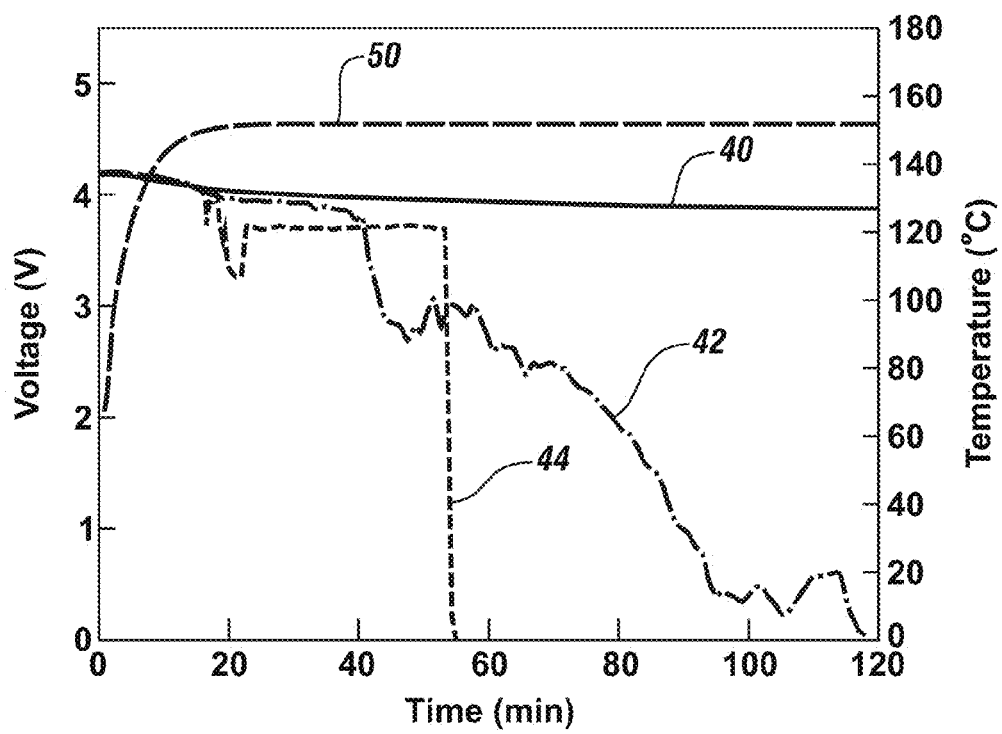
FIG. 5 is a graph illustrating the open circuit voltage as a function of time for several lithium-ion button cells when maintained at a skin temperature of 150° C. The cells, otherwise identical, were fabricated with different separators: a bi-layer ceramic-polymer separator; a commercial polyolefin separator; and a PVDF polymer layer only.

FIG. 5 shows the superior elevated temperature stability of a lithium ion cell incorporating a 20 micrometer thick SiO$_2$/5 micrometer thick microporous PVDF bi-layer separator fabricated as described. The cell was fabricated as a CR 2325 button cell (23.0 millimeters in diameter×2.5 millimeters thick). The cell employed LiNi$_{1/3}$Co$_{1/3}$Mn$_{1/3}$O$_2$ (NCM) as the cathode, graphite as the anode, and 1M LiPF$_6$ in ethylene carbonate (EC)/diethyl carbonate (DEC) (1:2 by volume) as the electrolyte. After charging to 4.3 volts the open circuit cell voltage was measured as a function of time as the cell skin temperature was first increased to 150° C. and then maintained at that temperature using an accelerating rate calorimeter.

For comparison, cells constructed using only a 25 micrometer thick microporous PVDF separator and a commercial polyolefin separator were also evaluated. The results for these cells are also shown in FIG. 5.

As can be seen from FIG. 5, the cell employing the bi-layer separator (curve 40) initially displayed a modest decline in output voltage, primarily as the temperature (curve 50) was ramping up to its set-point of 150° C., and then remained at a substantially constant output voltage over the test duration.

The cell with the commercial polyolefin separator (curve 44), like the cell with the bi-layer separator initially shows a modest decline in output voltage as the temperature increases but the most obvious feature is the precipitous decline in voltage to zero output voltage after only a short time at maximum (150° C.) temperature. The cell with only the PVDF separator (curve 42) likewise initially tracked the behavior of the bi-layer separator but then progressively declined to zero output over the total test time.

While preferred embodiments of the invention have been described as illustrations, these illustrations are not intended to limit the scope of the invention.

The invention claimed is:

1. A method of making an anode with an integral bi-layer separator for a lithium-ion battery, the bi-layer separator comprising a porous layer of separator particles and a pore-containing separator polymer layer, the bi-layer separator, when immersed in a liquid electrolyte, being adapted for transport of lithium ions to and from the anode, the method comprising:
    forming a layer of a porous anode material on a surface of a current collector, the anode material layer having an inner surface in contact with the current collector and an outer surface;
    forming the separator particle layer of the bi-layer separator by:
    covering a pre-selected portion of the outer surface of the anode layer with loose, contacting, electrically non-conducting particles with an average particle size to form a separator particle layer comprising interconnected pores for accommodating the liquid electrolyte and to enable passage of ions through the separator particle layer, the separator particle layer being at least two particles deep, the separator particle layer having a surface opposing the anode outer surface and a preselected thickness, the pre-selected, particle-covered portion of the outer anode surface being surrounded by an uncovered outer anode surface portion; then,
    forming the pore-containing separator polymer layer of the bi-layer separator by;
    preparing a liquid precursor comprising a single liquid phase solution of the bi-layer separator polymer in a mixed liquid comprising a liquid solvent for the separator polymer and a second liquid, miscible with the liquid separator polymer solvent and having a higher boiling point than the liquid separator polymer solvent, the second liquid being a non-solvent for the separator polymer;
    applying a volume of the liquid precursor sufficient to wet and coat and at least partially infiltrate the separator particle layer, and to cover the separator particle layer and to extend onto the surrounding uncovered outer anode surface; and,
    progressively evaporating the initial liquid precursor so as to first remove the liquid polymer separator solvent portion and to form separate phases comprising the pore-containing separator polymer and the separator polymer non-solvent liquid, the separator polymer non-solvent being dispersed in the pores of the pore-containing separator polymer, and continuing to evaporate the separator polymer non-solvent to leave the pore-containing separator polymer covering the separator particle layer and having a peripheral portion enclosing the periphery of the separator particle and bonded to the uncovered outer anode surface, the pores of the pore-containing separator polymer layer extending throughout the pore-containing separator polymer layer to enable transport of ions through the thickness of the pore-containing separator polymer layer when the pore-containing separator polymer layer is immersed in a liquid electrolyte.

2. The method of making an anode with an integral bi-layer separator for a lithium-ion battery as recited in claim 1 in which the anode is formed by spreading a slurry of graphite, carbon black and a binder dissolved in a binder solvent on a surface of a current collector and evaporating the solvent to bond a layer of the porous anode material to the current collector.

3. The method of making an anode with an integral bi-layer separator for a lithium-ion battery as recited in claim 1 in which the separator polymer is polyvinylidene fluoride (PVDF), the separator polymer solvent is acetone and the separator polymer non-solvent is water.

4. The method of making an anode with an integral bi-layer separator for a lithium-ion battery as recited in claim 1 in which the average particle size ranges from about 0.005 micrometers to 10 micrometers.

5. The method of making an anode with an integral bi-layer separator for a lithium-ion battery as recited in claim 1 in which the thickness of the separator particle layer ranges from about 5 micrometers to about 40 micrometers.

6. The method of making an anode with an integral bi-layer separator for a lithium-ion battery as recited in claim 1 in which the anode and an opposing cathode have complementary peripheral shapes and the anode peripheral shape overhangs the cathode peripheral shape.

7. The method of making an anode with an integral bi-layer separator for a lithium-ion battery as recited in claim 1 in which the electrically non-conducting particles are oxides or nitrides of one or more of the group consisting of silicon, aluminum, titanium, magnesium or calcium.

8. The method of making an anode with an integral bi-layer separator for a lithium-ion battery as recited in claim 1 in which the electrically non-conducting particles are aluminum oxide.

9. A method of making an anode with an integral bi-layer separator for a lithium-ion battery, the bi-layer separator comprising a porous layer of particles and a pore-containing polymer layer, the bi-layer separator, when immersed in a liquid electrolyte, being adapted for transport of lithium ions to and from the anode, and for inhibiting conductive material from the anode from penetrating through the bi-layer separator, the method comprising:
    forming an anode layer on a surface of an underlying current collector, the anode layer having a surface in contact with the current collector and an opposing outer surface;
    forming the particle layer of the bi-layer separator by:
    covering the outer anode surface with particles by applying a thickness of a particle-rich, slurry comprising a binder polymer, a binder-polymer solvent and abutting, electrically non-conducting particles to the outer surface of the anode, the particles having a maximum particle size, the thickness of the applied particle-rich slurry being at least equal to twice the maximum particle size;
    evaporating the binder-polymer solvent to form a particle layer with the thickness and an outer surface and comprising particles at least partially coated with the binder polymer and electrolyte-accommodating pores located between contacting particles and extending through the thickness of the particle layer, the binder polymer coating serving to secure the particles to one another and to the anode outer surface; then,
    forming the pore-containing separator polymer layer of the bi-layer separator by;
    preparing a liquid precursor solution for the polymer layer, the liquid precursor solution comprising a separator polymer dissolved in a mixture of two miscible liquids, a separator polymer solvent and a separator polymer non-solvent, each of the separator polymer solvent and separator polymer non-solvent having boiling points, the separator polymer non-solvent boiling point being higher than the separator polymer solvent boiling point, the liquid precursor being adapted to promote the formation of the pore-containing separator polymer layer through phase separation on evaporation of the separator polymer solvent and separator polymer non-solvent;

applying a volume of the liquid precursor solution to the outer surface of the particle layer, the liquid precursor solution being adapted to wet and at least partially infiltrate the particle layer and to promote the formation of the pore-containing separator polymer layer through phase separation on evaporation of the separator polymer solvent and separator polymer non-solvent; and, progressively evaporating the separator polymer solvent and separator polymer non-solvent to form the pore-containing polymer layer overlying, and adhering to, the particle layer, the pores of the pore-containing separator polymer layer extending throughout the pore-containing separator polymer layer so that the pore-containing separator polymer layer enables transport of ions through the thickness of the separator pore-containing polymer layer when the separator pore-containing polymer layer is immersed in a liquid electrolyte.

10. The method of making an anode with an integral bi-layer separator for a lithium-ion battery as recited in claim 9 in which the anode is formed by spreading a slurry of graphite, carbon black and a polymer anode binder binder dissolved in a polymer anode binder solvent on a copper current collector and evaporating the polymer anode binder solvent to form the porous anode layer.

11. The method of making an anode with an integral bi-layer separator for a lithium-ion battery as recited in claim 9 in which the separator polymer is polyvinylidene fluoride (PVDF), the separator polymer solvent is acetone and the separator polymer non-solvent is water.

12. The method of making an anode with an integral bi-layer separator for a lithium-ion battery as recited in claim 9 in which the binder and separator polymers are of like composition.

13. The method of making an anode with an integral bi-layer separator for a lithium-ion battery as recited in claim 9 in which the average particle size ranges from about 0.005 micrometers to 10 micrometers.

14. The method of making an anode with an integral bi-layer separator for a lithium-ion battery as recited in claim 9 in which the thickness of the particle layer ranges from about 5 micrometers to about 40 micrometers.

15. The method of making an anode with an integral bi-layer separator for a lithium-ion battery as recited in claim 9 in which the anode and cathode have complementary peripheral shapes and the anode peripheral shape overhangs the cathode peripheral shape.

16. The method of making an anode with an integral bi-layer separator for a lithium-ion battery as recited in claim 9 in which the electrically non-conducting particles are oxides or nitrides of one or more of the group consisting of silicon, aluminum, titanium, magnesium or calcium.

17. A lithium-ion cell with a lithium-ion electrolyte, an anode and a cathode, each of the anode and cathode having a face and complementarily-shaped peripheries, and each of the anode and cathode arranged with their faces in opposition, the anode face having an integral bi-layer separator comprising:

a separator particle layer covering at least some portion of the anode face with a remaining, particle-free portion of the anode face surrounding the separator particle layer portion of the anode face, or, optionally, the separator particle layer covering the entirety of the anode face, the separator particle layer being in contact with the anode face, the separator particle layer having a thickness and an outer surface, the separator particle layer being at least two particles deep and comprising contacting, non-electrically-conducting particles, and continuous pores for accommodating the lithium-ion electrolyte, the pores extending through the separator particle layer thickness; and a particle-free, porous, separator polymer layer adapted for lithium ion transport, the particle-free, porous, separator polymer layer being coextensive with the anode face and covering both the separator particle layer and any surrounding, particle-free portion of the anode face, the particle-free porous, separator polymer layer having a thickness and opposing sides, one side being in contact with and overlying the separator particle layer and any particle-free portion of the anode face, the particle-free porous separator polymer layer being secured to the anode face at at least the anode periphery to maintain the separator particle layer in contact with the anode face, the particle-free porous separator polymer layer being formed by evaporating a separator polymer-containing liquid comprising the separator polymer dissolved in liquid containing a miscible separator polymer solvent and a separator polymer non-solvent, the separator polymer-containing liquid being applied to the anode face and the separator particle layer in a volume sufficient to wet, to at least partially infiltrate, and to cover the separator particle layer and any surrounding, particle-free, anode surface.

18. The lithium-ion cell recited in claim 17 in which the separator polymer is polyvinylidene fluoride (PVDF), the separator polymer solvent is acetone and the separator polymer non-solvent is water.

19. The lithium-ion cell recited in claim 17 in which the average particle size ranges from about 0.005 micrometers to 10 micrometers.

20. The lithium-ion cell recited in claim 17 in which the thickness of the particle layer ranges from about 5 micrometers to about 40 micrometers.

* * * * *